United States Patent
Qiu et al.

(10) Patent No.: US 11,691,121 B2
(45) Date of Patent: Jul. 4, 2023

(54) LIGNIN-BASED HIERARCHICAL POROUS CARBON WITH HIGH SPECIFIC SURFACE AREA AND PREPARATION METHOD AND APPLICATION THEREOF

(71) Applicants: SOUTH CHINA UNIVERSITY OF TECHNOLOGY, Guangzhou (CN); GUANGDONG UNIVERSITY OF TECHNOLOGY, Guangzhou (CN)

(72) Inventors: Xueqing Qiu, Guangzhou (CN); Dongjie Yang, Guangzhou (CN); Hongming Lou, Guangzhou (CN); Yanlin Qin, Guangzhou (CN); Yong Qian, Guangzhou (CN); Jinhao Huang, Guangzhou (CN); Zhixian Li, Guangzhou (CN); Yuxia Pang, Guangzhou (CN)

(73) Assignees: SOUTH CHINA UNIVERSITY OF TECHNOLOGY, Guangzhou (CN); GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/971,367

(22) Filed: Oct. 21, 2022

(65) Prior Publication Data
US 2023/0127268 A1 Apr. 27, 2023

(30) Foreign Application Priority Data

Oct. 22, 2021 (CN) .......................... 202111233499.7

(51) Int. Cl.
*B01J 20/20* (2006.01)
*C01B 32/324* (2017.01)
(Continued)

(52) U.S. Cl.
CPC ........... *B01J 20/20* (2013.01); *B01J 20/3078* (2013.01); *B01J 20/3085* (2013.01);
(Continued)

(58) Field of Classification Search
None
See application file for complete search history.

(56) References Cited

U.S. PATENT DOCUMENTS

2022/0055012 A1* 2/2022 Mlsna ..................... B01J 20/20

FOREIGN PATENT DOCUMENTS

| CN | 103301821 A | 9/2013 |
|---|---|---|
| CN | 104292496 A | 1/2015 |

(Continued)

OTHER PUBLICATIONS

Sevilla, Marta et al., "One-Pot Synthesis of Biomass-Based Hierarchical Porous Carbons with a Large Porosity Development," Chemistry of Matererials, 2017, pp. 6900-6907, vol. 29, American Chemical Society.

(Continued)

*Primary Examiner* — Chester T Barry
(74) *Attorney, Agent, or Firm* — Muncy, Geissler, Olds & Lowe, P.C.

(57) ABSTRACT

The present invention discloses a lignin-based hierarchical porous carbon with high specific surface area and preparation method and application thereof. The present invention employs maleic anhydride, acrylic acid, and hypophosphorous acid to modify a lignin, then performs a cross-linking reaction with a glutaraldehyde-triethanolamine condensate to prepare a lignin graft-copolymerized by phosphino carboxylic acid copolymer, and then dropwise adding a soluble calcium salt solution and a soluble carbonate solution into the lignin graft-copolymerized by phosphino carboxylic acid copolymer dispersion successively, co-precipitates to pre- (Continued)

pare a lignin/nano $CaCO_3$ complex, finally obtains a lignin-based hierarchical porous carbon with high specific surface area through carbonizing at a high temperature. The preparation method of the present invention may enable nano $CaCO_3$ to be uniformly and stably dispersed in a three-dimensional network structure of the lignin graft-copolymerized by phosphino carboxylic acid copolymer, realizing full and uniform complexation of the lignin with nano $CaCO_3$.

10 Claims, 3 Drawing Sheets

(51) Int. Cl.
*C01B 32/348* (2017.01)
*B01J 20/30* (2006.01)
*C02F 1/28* (2023.01)
*C02F 101/34* (2006.01)

(52) U.S. Cl.
CPC .......... *C01B 32/324* (2017.08); *C01B 32/348* (2017.08); *C02F 1/283* (2013.01); *C02F 2101/34* (2013.01); *C02F 2101/40* (2013.01)

(56) References Cited

FOREIGN PATENT DOCUMENTS

| | | |
|---|---|---|
| CN | 108484818 A | 9/2018 |
| CN | 109851813 A | 6/2019 |
| CN | 112403442 A | 2/2021 |
| CN | 113307250 A | 8/2021 |
| WO | WO-2018/229220 A1 | 12/2018 |

OTHER PUBLICATIONS

Sun, Yong et al., "Hybrid adsorbent prepared from renewable lignin and waste egg shell for $SO_2$ removal: Characterization and process optimization," Ecological Engineering, 2018, pp. 139-148, vol. 115, Elsevier B.V.

\* cited by examiner ent of lignin through a hydro-thermal pretreatment at 350°
LIGNIN-BASED HIERARCHICAL POROUS CARBON WITH HIGH SPECIFIC SURFACE AREA AND PREPARATION METHOD AND APPLICATION THEREOF

Technical Field

The present invention belongs to a technical field of porous carbon, and particularly relates to a lignin-based hierarchical porous carbon with high specific surface area and preparation method and application thereof.

Background

At present, the methods used to treat wastewater contaminated by antibiotics and other drugs mainly include an adsorption method, a biofilm method, an activated sludge degradation method, etc. Among them, the adsorption method is widely used in the treatment of wastewater contaminated by antibiotics due to its advantages of wide application range, simple equipment, high efficiency and low cost etc. The key of the adsorption method is to research and develop a high-efficiency and low-cost adsorbent. Porous carbon has advantages of abundant porous structure, large specific surface area and stable propertiy etc., and is one of the most widely used adsorbent materials for wastewater. Wherein, a biomass-based porous carbon has received extensive attention due to its abundant sources of raw material, being renewable and low cost.

Lignin is a natural phenolic high-molecular compound having a three-dimensional network structure, a content of which in a plant ranks only second to cellulose. The lignin structure contains abundant oxygen-containing functional groups such as methoxyl, hydroxyl, carboxyl, carbonyl and the like groups and numerous aromatic rings, and has advantages of easy modification and structure regulation. Industrially, numerous industrial lignin by-products are produced every year, and most of the industrial lignin cannot be effectively utilized as a resource and causes environmental pollution, and the industrial lignin having wide source, low cost, and high carbon content is an ideal carbon precursor for preparing porous carbon.

A preparation method for the lignin-based porous carbon mainly included an activation method, a template method and the like. In the activation method, KOH, $K_2CO_3$, $ZnCl_2$, $H_3PO_4$ or the like chemical activator was usually utilized for etching and creating pores. Sangchoom et al. (ACS Sustainable Chemistry & Engineering, 2015, 3 (7): 1658-1667) obtained a porous carbon by taking a lignin waste residue as a raw material, conducting desalination and carbon enrichment of lignin through a hydro-thermal pretreatment at 350° C., and utilizing KOH for activating and carbonizing, which had a maximum specific surface area of 3235 $m^2/g$, a volume of pore of 1.77 $cm^3/g$, and a microporosity of 93%. Chen et al. (Environmental Science and Pollution Research, 2021, 28(21): 27398-27410) prepared a porous carbon by taking $K_2CO_3$ as an activator, grinding and mixing $K_2CO_3$ with sodium lignosulfonate at a ratio of 4:1, and activating and carbonizing the same, which had a specific surface area of 1305.5 $m^2/g$, pore structures almost all being micropores, and maximum adsorption capacity for chloramphenicol of 534 mg/g. In the above-described method, an amount of the activator was larger (with a ratio of the activator to lignin exceeding 3), the specific surface area of the porous carbon was larger. However, there were too many micropores, the adsorption capacity for antibiotics was larger, but the adsorption rate is low. Especially, during preparing a lignin-based porous carbon by the chemical activation method, there were problems such as single porous structure, difficulty in control, and strong corrosiveness of the activator etc.

In the template method, a porous carbon was prepared by using a templating agent having a certain structural morphology through a spatial orientation effect, and a structure of the pore and channels in the obtained porous carbon was regular and can be regulated. For example, Saha et al. (Carbon, 2014, 71: 47-57) obtained a mesoporous carbon having a three-dimensional structure by taking a sulfate lignin as a carbon source and F127 as a template, self-assembling of a solution and carbonizing at 1000° C., whose specific surface area was 400 $m^2/g$, and pore diameter was intensively distributed in 4-6 nm. Chinese patent CN10875116B prepared a lignin-based porous carbon by uniformly mixing and assembling nano silicon dioxide as a templating agent with alkali lignin, and then suffering from a hydro-thermal reaction and carbonizing at a high temperature, whose maximum specific surface area was 1500 $m^2/g$, volume of pore was 3.5 $cm^3/g$, pore diameter range was 5-50 nm. Porous carbon prepared by the template method usually had a mesopore and macropore structure, higher adsorption rate for antibiotics, but lower adsorption capacity for pollutants due to micropore and smaller specific surface area.

Numerous researches demonstrated that a hierarchical porous structure of the macropore/mesopore/micropore and high specific surface area was an important factor for improving the adsorption capacity and adsorption rate for antibiotics of the porous carbon. Additionally, since different kinds of antibiotics had broader molecular weight distributions (greater than one order of magnitude), a porous carbon of single pore diameter distribution (mesopore or micropore) had no universal applicability as an adsorbent for antibiotics. For example, a porous carbon with high microporosity had poorer adsorption performance for antibiotics with bigger molecular weight, and a porous carbon with high mesoporosity had poorer adsorption performance for antibiotics with smaller molecular weight. A lignin-based porous carbon obtained by traditional chemical activation or template method had shortcomings such as single porous structure, insufficient and inhomogeneous development of the porous structure, or smaller specific surface area etc., for which it is difficult as the adsorbent to simultaneously improve the adsorption rate and adsorption capacity.

In order to address the above problems, the researches in the prior art employed a two-step template activation method and the like method for increasing porosity, constituting a hierarchical porous structure, and enlarging specific surface area. For example, Chang et al. (Industrial & Engineering Chemistry Research, 2017, 56 (33): 9367-9375) prepared a three-dimensional hierarchical porous carbon by firstly carbonizing with sodium lignosulfonate as a carbon source, and silicon dioxide (with an amount three times that of the carbon source) as a templating agent, then grinding with KOH at a ratio of 1:4, and secondly activating, which had a specific surface area of 2784 $m^2/g$, and a volume of pore of 1.382 $cm^3/g$. The three-dimensional hierarchical porous carbon had a hierarchical pore and channel of micropore/mesopore/macropore, had a maximium adsorption capacity for sulfamethazine of 869.6 mg/g, and could reach adsorption equilibrium within 30 min, with a suprerior adsorption capacity and a bigger adsorption rate. However, this method required for suffering from a two-step carbonizing, using a large amount of silicon dioxide and KOH as the templating agent and the activator, complicated process, and high preparing cost, and had strong corrosiveness.

In order to avoid a multi-step carbonizing, researchers tried to seek a one-step carbonizing method for preparing a porous carbon having hierarchical porous structure and high specific surface area. An insoluble carbonate or oxalate released $CO_2$ during a high-temperature pyrolysis, which could activate the porous carbon for pore-creating, therefore may play roles of both templating agent and activator. For example, $CaCO_3$, zinc carbonate or zinc oxalate etc. were usually usd for preparing a porous carbon. Chinese patent CN112794324A prepared a hierarchical porous carbon by obtaining a alkali lignin/basic zinc carbonate complex through using alkali lignin, patassium carbonate and zinc acetate as raw materials via hydro-thermal treatment, and then suffering from carbonizing at a high temperature, whose maximum specific surface area was 485 $m^2/g$, total volume of pore was 3.5 $cm^3/g$, and mesoporosity was greater than 67%. It had better performance while applied for a negative electrode material for lithium ion battery, however, had too low microporosity and too small specific surface area as an adsorbing material, so that efficient adsorption performance can't be obtained. Chinese patent CN109485029B obtained a lignin-based porous carbon nanosheet by preparing a lignin/zinc oxalate complex through layer by layer self assembly in a selective solvent, and further carbonizing with zinc oxalate as an activator, and water-soluble sulfonated lignin as a carbon precursor and dispersant, whose specific surface area was 1069 $m^2/g$, with a specific surface area for the micropore and a specific surface area for the mesopore being respectively 406 $m^2/g$ and 663 $m^2/g$, and a total volume of pore was 1.4 $cm^3/g$. The lignin-based carbon nanosheets obtained by this method mainly acted as electrode material for a supercapacitor due to higher mesoporosity and smaller specific surface area, and were not appropriate as an adsorbent material for antibiotics due to sheet structure and pore and channel distribution thereof.

As a cheap and stable compound, $CaCO_3$ had better application acting as a templating agent and activator for porous carbon. For example, Chinese patent CN106732352A prepared a porous carbon by impregnating and carbonizing at a high temperature with flour as a raw material, and $CaCO_3$ as a templating agent and activator. However, the flour and $CaCO_3$ are both insoluble raw materials in this method, with the mixing therebetween being inhomogeneous and a particle diameter of $CaCO_3$ being bigger, which was therefore adverse to manufacturing of a mesopore and micropore structure, the obtained porous carbon had a smaller specific surface area only of 441.2 $m^2/g$. Chinese patent CN109336080A prepared a hierarchical porous carbon by subjecting starch or cellulose with a certain proportion of $CaCO_3$ particles with different dimensions to solvent mixing, hydro-thermal treatment and high-temperature pyrolysis, which had a bigger specific surface area of 1437 $m^2/g$, volume of pore of 0.902 $cm^3/g$, and pore diameter concentrated in 2 nm or less, and presented a portion of mesopores and macropores. However, in this method, $CaCO_3$ and the carbon source are in a suspended and dispersed state during solvent mixing, and a combination of $CaCO_3$ with the carbon source was inhomogeneous, so that it was difficult to fully paly the activating role thereof. In order to promote a close coating of $CaCO_3$ by the carbon source, Shi et al. (Fuel Processing Technology, 2020, 199: 106247) prepared a hierarchical porous carbon by mixing and ball-milling straw with nano $CaCO_3$ particles and further compressing into columnar tablets, and carbonizing and activating in stages, which had a pore diameter distribution concentrated in middle mesopores (20 nm), small mesopores (5 nm) and micropores (<2 nm), and a specific surface area of 742 $m^2/g$, and had an adsorption capacity up to 170 mg/g when used in removing HgO from flue gases.

In the above technologies, the formation of the precursor biomass/$CaCO_3$ complex was realized by physically blending, a force acting between $CaCO_3$ and biomass was very weak, and the complexation of these two had problems of unevenness and poor coating. By a co-precipitation method, the mixing of $CaCO_3$ with biomass at a molecular level could be realized, which was beneficial to obtain a uniformly complexed precursor. Chinese patent CN107213872B prepared a hydro-thermal biomass carbon loaded with $CaCO_3$ by stirring and mixing straw powder, calcium chloride and sodium carbonate in water, and suffering them to a hydro-thermal reaction. In this method, the straw powder was an insoluble solid, and the calcium salt and a precipitant could not fully impregnate in interior thereof. Due to inhomogeneous distribution of $CaCO_3$ in the hydro-thermal carbon, an abundant and uniform porous structure can't be obtained even if it was used as a precursor of a porous carbon. Fu et al. (Materials Science and Engineering: C, 2014, 44: 216-224) prepared a lignocellulose/$CaCO_3$ complex material by dissolving a lignocelluloses in an ionic liquid [Bmin]Cl, then successively adding anhydrouos $CaCl_2$ and $Na_2CO_3$ thereinto upon vigorously stirring, and suffering from microwave assisted heating. $Ca^{2+}$ may combine with carboxyl groups on a molecular chain of the lignocellulose dissolved in the ionic liquid, which promoted the complexation of $CaCO_3$ with the lignocellulose during a nucleation process, and $CaCO_3$ particles in this complex attached on the surface of the lignocellulose or embedded partly in the lignocelluloses. Further, its dimension was in a range of 250 nm to 2 μm. Therefore, it is difficult to prepare a carbon material having a hierarchical porous structure even if the lignocellulose/$CaCO_3$ complex synthesized by this method was used as a precursor. Gao et al. (Microporous and Mesoporous Materials, 2018, 260: 172-179) obtained a hierarchical porous carbon by utilizing a collagen protein deriving from steaming pigskin as a raw material, successively adding solutions of calcium nitrate and patassium carbonate thereinto, preparing a collagen protein/$CaCO_3$/patassium nitrate complex through co-precipitation, and further carbonizing at a high temperature, which had a structure of micropores, small mesopores concentrated in 2-4 nm and a portion of macropore, and a specific surface area of 2700 $m^2/g$, and which was used for adsorbing carbon dioxide and hydrogen gas, thereby being beneficial for rapid diffusion and adsorption of the gas. However, due to lower carbon content in the collagen protein of pigskin, its yield was only 7.3%. Moreover, pigskin was animal-derived biomass, which had a relatively high cost than that of the plant biomass. Additionally, due to tightness of the structure of the collagen protein, $CaCO_3$ in the precursor obtained through co-precipitation thereof could still not better embed within the collagen protein. Compared with the above biomasses, an industrial lignin had high carbon content and abundant oxygen-containing functional group, but had a poor water-soluble and was at a highly aggregated state in a solution, and had poor dispersing and complexing ability for solid particles.

In summary, the lignin-based porous carbon had problems in terms of structure, performance and material preparation as an adsorbent for antibiotics:

(1) The porous structure of the porous carbon was not fully developed, which had small specific surface area, single porous structure or unreasonable pore and channel distribution of micropore/mesopore, as well as poor connectivity of pore and channel.

(2) It had few adsorption sites, poor connectivity of pore and channel and low utilization rate, resulting in low adsorption capacity and slow adsorption rate, which is not universal for the adsorption of antibiotics of different molecular weights.

(3) In traditional activating or template methods, only a single pore and channel or smaller specific surface area could be obtained; although a hierarchical pore and channel and high specific surface area may be obtained, numerous steps and large quantity of the activator were required with strong corrosiveness, in the two-step template activation method; a hierarchical pore and channel can be obtained by using carbonate or oxalate as a templating agent and activator, and further carbonizing, but fully uniform complexation could not form between the templating agent and the carbon source due to insolubility of the templating agent and insolubility or structure compactness of the carbon source, so that it is difficult to play its role of template and activating.

Summary

In order to address the shortcomings and deficiencies of the prior art, a primary objective of the present invention is to provide a preparation method for a lignin-based hierarchical porous carbon with high specific surface area.

The method of the present invention prepares a lignin-based hierarchical porous carbon with high specific surface area by utilizing a lignin graft-copolymerized by phosphino carboxylic acid copolymer as a carbon precursor, a soluble calcium salt and a soluable carbonate as a calcium source and a precipitant, through a co-precipitation method and a high-temperature carbonizing method. Firstly, the lignin is modified with maleic anhydride, acrylic acid, and hypophosphorous acid; and is then subjected to a cross-linking reaction with a condensate of glutaraldehyde and triethanolamine to prepare a lignin graft-copolymerized by phosphino carboxylic acid copolymer. Additionally, a lignin/nano $CaCO_3$ complex is prepared by successively dropwise adding a soluble calcium salt and a soluable carbonate into the lignin graft-copolymerized by phosphino carboxylic acid copolymer dispersion through co-precipitation, which is finally subjected to carbonizing at a high temperature to obtain a lignin-based hierarchical porous carbon with high specific surface area. In the preparing process of the method of the present invention, the graft-copolymerizing modification of the lignin by phosphino carboxylic acid copolymer effectively increases combination sites of $Ca^{2+}$ in the lignin. Further, the cross-linking reaction of the lignin with the glutaraldehyde-triethanolamine condensate improves the molecular weight and better constructs a three-dimensional network structure. Finally, the lignin graft-copolymerized by phosphino carboxylic acid copolymer can effectively inhibit $CaCO_3$ from growing through its complexing and adsorbing effect to $Ca^{2+}$ and dispersing effect to $CaCO_3$, thereby obtaining a uniformly and stably dispersed nano $CaCO_3$. The co-precipitation process of the lignin graft-copolymerized by phosphino carboxylic acid copolymer with the calcium salt and the carbonate may embed the generated nano $CaCO_3$ in a three-dimensional network structure of the lignin, realizing a full and uniform complexation of the lignin with the nano $CaCO_3$. During the carbonization of the lignin/nano $CaCO_3$ complex at a high temperature, on the one hand, the uniformly distributed nano $CaCO_3$ generates a structure of mesopores and a portion of macropores as a hard templating agent through a space-occupying effect, avoiding a contraction of the lignin-based porous carbon during carbonizing; on the other hand, carbon dioxide released during its pyrolysis can generate micropores through gas-phase exfoliation or a reduction reaction with the lignin-based porous carbon, realizing full development for the porous structure, to obtain a lignin-based hierarchical porous carbon having high specific surface area with interlinked pores and channels. When used as an adsorbent for waste water of antibiotics, the lignin-based hierarchical porous carbon can provide rapid mass transfer channels and abundant adsorption sites, and have excellent adsorption performance and adsorption rate for all antibiotics of different molecular weights.

Another objective of the present invention is to provide a lignin-based hierarchical porous carbon with high specific surface area prepared by the above-described method.

Another objective of the present invention is to provide an application of the above-described lignin-based hierarchical porous carbon with high specific surface arean in adsorption of antibiotic-contaminated wastewater.

Objectives of the present invention are realized by the following technical solutions:

A preparation method for a lignin-based hierarchical porous carbon with high specific surface area comprises the following steps:

(1) stirring and mixing aqueous solutions of triethanolamine and glutaraldehyde at 50 to 80° C., and reacting for 1 to 6 h, to obtain a solution of triethanolamine-glutaraldehyde condensate;

(2) formulating a lignin into an aqueous solution having a mass concentration of 50 to 300 g/L, then adding maleic anhydride, acrylic acid and hypophosphorous acid thereinto, stirring evenly at 60 to 80° C., then dropwise adding an initiator solution having a certain mass concentration, reacting for 2 to 4 h, then adding the solution of condensate of the step (1) thereinto, and continuing to react for 1 to 6 h, to obtain a solution of lignin graft-copolymerized by phosphino carboxylic acid copolymer;

(3) adding an aqueous solution of a soluble calcium salt into the solution of lignin graft-copolymerized by phosphino carboxylic acid copolymer obtained in the step (2) at a certain flowing velocity, continuing to stir and mix for 30 min to 2 h after a completion of the adding, then adding an aqueous solution of a soluable carbonate thereinto at a certain flowing velocity, continuing to stir and mix for 1 to 3 h after a completion of the adding, standing still and aging for 3 to 6 h, filtering and separating out a precipitate, and drying the precipitate, to obtain a lignin/nano $CaCO_3$ complex; and (4) carbonizing the lignin/nano $CaCO_3$ complex obtained in the step (3) in an inert atmosphere or a nitrogen gas, then washing with an acid, washing with water, filtering, and drying, to obtain a lignin-based hierarchical porous carbon;

in terms of parts by weight, a formula for quantities of respective reactants is as follows:

| | |
|---|---|
| lignin | 100 parts, |
| triethanolamine | 5 to 20 parts, |
| glutaraldehyde | 5 to 20 parts, |
| maleic anhydride | 2 to 20 parts, |
| acrylic acid | 2 to 20 parts, |
| hypophosphorous acid | 1 to 10 parts, |

| | |
|---|---|
| initiator | 2 to 20 parts, |
| soluble calcium salt | 50 to 100 parts, and |
| soluable carbonate | 50 to 100 parts. |

Preferably, the lignin in the step (2) can be at least one selected from the group consisting of sodium lignosulfonate, calcium lignosulphonate, and magnesium lignosulfonate in red liquor from acid pulping, a sulfonated product of alkali lignin in black liquor from alkaline pulping, and a sulfonated product of enzymatic lignin from a biorefinery process.

Preferably, in the mixed solution of triethanolamine and glutaraldehyde in the step (1), the mass concentrations of triethanolamine and glutaraldehyde are both 20 to 200 g/L.

Preferably, the initiator in the step (2) is sodium persulfate; a velocity for dropwise adding the initiator solution is 2 to 15 mL/min, is more preferably 5 to 10 mL/min; and a mass concentration of the initiator solution is 20 to 100 g/L.

Preferably, solvents for the solutions in the steps (2) and (3) are both water.

Preferably, mass concentrations of the soluble calcium salt solution and the soluable carbonate solution in the step (3) are 50 to 200 g/L, and the velocities for the adding are both 50 to 100 mL/min.

Preferably, in the step (3), the soluble calcium salt is at least one of calcium chloride, calcium nitrate and calcium acetate; and the soluable carbonate is at least one of patassium carbonate, sodium carbonate, and ammonium carbonate.

Preferably, in the step (4), a temperature for the carbonizing is 650 to 950° C., is more preferably 750 to 850° C.; and a time for the carbonizing is 1 to 4 h, is more preferably 2 to 3 h.

Preferably, the washing with the acid in the step (4) refers to placing the carbonized product in a solution of the acid of 0.5 to 2 mol/L and soaking for 3 to 12 h; and the solution of the acid is at least one of a solution of hydrochloric acid, a solution of sulfuric acid and a solution of nitric acid.

Preferably, the drying in the steps (2) to (4) may all be at least one of blast drying, vaccum drying, infrad drying and frozen drying means.

The present invention will be described below in more detail:

(1) Stirring and mixing aqueous solutions of triethanolamine and glutaraldehyde at 50 to 80° C., and reacting for 1 to 6 h, to obtain a solution of triethanolamine-glutaraldehyde condensate.

This step is to obtain the triethanolamine-glutaraldehyde condensate, as a subsequent crosslinking agent for crosslinking modification of the lignin, and is beneficial to obtain a stably structured lignin with a three-dimensional network structure.

(2) Formulating a lignin into an aqueous solution having a mass concentration of 50 to 300 g/L, then adding maleic anhydride, acrylic acid and hypophosphorous acid thereinto, stirring evenly at 60 to 80° C., then dropwise adding sodium persulfate solution having a certain mass concentration as an initiator, reacting for 2 to 4 h, then adding the solution of condensate of the step (1) thereinto, and continuing to react for 1 to 6 h, to obtain a solution of lignin graft-copolymerized by phosphino carboxylic acid copolymer.

This step is to obtain a lignin graft-copolymerized by phosphino carboxylic acid copolymer having abundant $Ca^{2+}$ combination sites and the three-dimensional network structure, wherein organic phosphino group and carboxyl group have a complexing and stabilizing effect on $Ca^{2+}$, and brached chain structure and three-dimensional network structure in the lignin copolymer have a dispersing effect on $CaCO_3$. A combination of the two effects can simultaneously control growth of $CaCO_3$ crystal and stably disperse $CaCO_3$ particles, and have a synergistic effect on realizing a full and uniform complexation of $CaCO_3$ with the lignin.

(3) Adding an aqueous solution of a soluble calcium salt into the solution of lignin graft-copolymerized by phosphino carboxylic acid copolymer obtained in the step (2) at a certain flowing velocity, continuing to stir and mix for 30 min to 2 h after a completion of the adding, then adding an aqueous solution of a soluable carbonate thereinto at a certain flowing velocity, continuing to stir and mix for 1 to 3 h after a completion of the adding, standing still and aging for 3 to 6 h, filtering and separating out a precipitate, and drying the precipitate, to obtain a lignin/nano $CaCO_3$ complex.

This step is to enable the nano $CaCO_3$ to uniformly and stably embed in a three-dimensional network structure of the lignin.

This step must control an order for dropwise adding the calcium salt and the carbonate, i.e. firstly dropwise adding the aqueous solution of calcium salt into the lignin dispersion and mixing, and then dropwise adding the aqueous solution of carbonate. Where firstly dropwise adding the carbonate and then dropwise adding calcium salt, the carbonate could not be adsorbed and dispersed stably in the lignin previously, and mainly distributed in the aqueous solution, so that a binding force between $CaCO_3$ generated after adding the calcium salt thereinto with the lignin is weak, and its distributionin is not homogeneous, and a micron-grade $CaCO_3$ with large particles could be only obtained.

(4) Carbonizing the lignin/nano $CaCO_3$ complex obtained in the step (3) in an inert atmosphere, then washing with an acid, washing with water, filtering, and drying, to obtain a lignin-based hierarchical porous carbon.

In this step, the inert atmosphere may be nitrogen gas, argon gas or the other inert gases, a temperature for the carbonizing is required to be within a range of 650 to 950° C., and a time for the carbonizing is 2 to 4 h. Too low the temperature for the carbonizing or too short the time for the carbonizing may lead to being unable to exhibit an activating effect of the nano $CaCO_3$, and incomplete carbonization of the lignin; and too high the temperature for the carbonizing or too long the time for the carbonizing may lead to excessive carbonization, a structure collapse for the lignin-based porous carbon, low product yield and higher energy consumption, and a rise for production cost.

The present invention provides a lignin-based hierarchical porous carbon with high specific surface area prepared by the above-described method. A lignin-based hierarchical porous carbon prepared by the method of the present invention has a specific surface area range of 2200 to 3000 $m^2/g$, a dimension of pore diameter of 0.5 to 100 nm, a total volume range of pore of 1.10 to 1.50 $cm^3/g$, a pore volume of the micropore of 0.50 to 0.90 $cm^3/g$, and a pore volume of the mesopore of 0.40 to 0.80 $cm^3/g$.

The present invention also provides an application of the above-described lignin-based hierarchical porous carbon with high specific surface arean in an adsorbing material for antibiotic-contaminated wastewater.

Compared with the prior art, the present invention has the following advantages and beneficial effects:

(1) A lignin-based hierarchical porous carbon prepared by the method of the present invention has an open and interconnected three-dimensional porous structure, whose porous structure within its interior is more fully developed. The lignin-based hierarchical porous carbon has a hierarchical porous structure of micropore/mesopore/macropore and high specific surface area, which provides rapid mass transfer channels and abundant adsorption site for itself during an adsorbing process. If it is applied in an adsorbent material for antibiotic-contaminated wastewater, an efficient and rapidly adsorbing of pollutants can be realized, and the adsorbent material all has excellent adsorption performance on the antibiotics of different molecular weights, and has good application potential.

(2) During the preparing process of a lignin-based hierarchical porous carbon of the present invention, the lignin, which has stable three-dimensional network structure and is rich in organic phosphino group, carboxyl group and branched chain structure, is firstly obtained by performing graft-copolymerizing modification of phosphino carboxylic acid copolymer on the lignin, and further crosslinking by means of a condensate of triethanolamine and glutaraldehyde. In addition, a complex of a carbon source with a templating agent is prepared by strictly controlling the order and the velocity for dropwise adding of the calcium salt and the carbonate during the co-precipitation process, realizing full and uniform complexation of the carbon source with the templating agent, and providing reference for efficiently developing the porous structure of carbon materials.

(3) A three-dimensional porous carbon having hierarchical porous structure and high specific surface area can be obtained by utilizing industrial lignin as the carbon source, as well as a cheap calcium chloride and patassium carbonate as a precursor for the templating agent through one-step carbonizing The raw materials are wide in sources, cheap and easily available. The preparing process thereof is simple, environmentally friendly, can also reduce pollution on environment while realizing resourceful utilization of the industrial lignin, and is economically and environmentally meaningful.

DETAILED DESCRIPTION OF EMBODIMENTS

Figure 1:
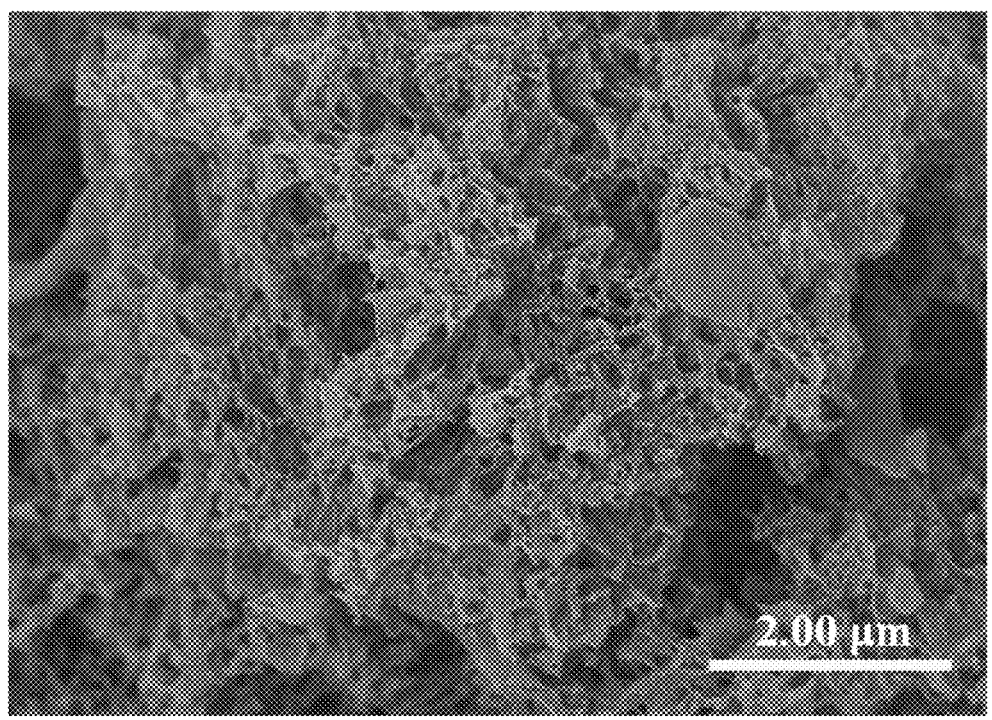
FIG. 1 is a SEM photograph of a lignin-based hierarchical porous carbon prepared in Example 1 of the present invention.

The present invention will be further described below in detail in combination with Examples and the drawings, but embodiments of the present invention are not limited thereto.

In Examples of the present invention, where particular conditions are not noted, it is carried out in accordance with conventional conditions or conditions recommended by the manufacturer. The raw materials and reagents, etc., which are not specified by the manufacturer, are all conventional products that can be commercially purchased from the market.

Example 1

The following steps are performed:

(1) dissolving 20 g triethanolamine in water to formulate a solution having a concentration of 150 g/L, dissolving 20 g glutaraldehyde in water to formulate a solution having a concentration of 150 g/L, mixing and reacting the formulated solutions of triethanolamine and glutaraldehyde at 80° C. for 4 h, to obtain a solution of triethanolamine-glutaraldehyde condensate;

(2) dissolving 100 g sodium lignosulfonate in water to formulate a solution having a concentration of 200 g/L, then adding 20 g maleic anhydride, 20 g acrylic acid and 10 g hypophosphorous acid thereinto, stirring evenly at 80° C., then adding 300 mL of a sodium persulfate solution having a concentration of 50 g/L thereinto at a velocity of 10 mL/min, reacting for 3 h, then adding the solution of condensate of the step (1) thereinto, and continuing to react for 4 h, to obtain a solution of lignin graft-copolymerized by phosphino carboxylic acid copolymer;

(3) adding 500 mL of an aqueous solution of calcium chloride having a mass concentration of 200 g/L into the above-described solution of lignin graft-copolymerized by phosphino carboxylic acid copolymer at a velocity of 100 mL/min, continuing to stir and mix for 2 h after a completion of the adding, then adding 500 mL of a patassium carbonate solution having a mass concentration of 200 g/L thereinto at a velocity of 100 mL/min, continuing to stir and mix for 3 h after a completion of the adding, standing still and aging for 6 h, filtering and separating out a precipitate, and drying the precipitate in a blast oven at 120° C. for 3 h, to obtain a lignin/nano $CaCO_3$ complex; and (4) raising a temperature of the lignin/nano $CaCO_3$ complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based hierarchical porous carbon.

Example 2

The following steps are performed:

(1) dissolving 5 g triethanolamine in water to formulate a solution having a concentration of 20 g/L, dissolving 5 g glutaraldehyde in water to formulate a solution having a concentration of 20 g/L, mixing and reacting the formulated solutions of triethanolamine and glutaraldehyde for 1 h at 50° C., to obtain a solution of triethanolamine-glutaraldehyde condensate;

(2) dissolving 100 g sodium lignosulfonate in water to formulate a solution having a concentration of 50 g/L, then adding 2 g maleic anhydride, 2 g acrylic acid and 1 g hypophosphorous acid thereinto, stirring evenly at 60° C., then adding 100 mL of a sodium persulfate solution having a concentration of 20 g/L thereinto at a velocity of 2 mL/min, reacting for 2 h, then adding the solution of condensate of the step (1) thereinto, and continuing to react for 1 h, to obtain a solution of lignin graft-copolymerized by phosphino carboxylic acid copolymer;

(3) adding 1000 mL of an aqueous solution of calcium chloride having a mass concentration of 50 g/L into the above-described solution of lignin graft-copolymerized by phosphino carboxylic acid copolymer at a velocity of 50 mL/min, continuing to stir and mix for 30 min after a completion of the adding, then adding 1000 mL of a patassium carbonate solution having a mass concentration of 50 g/L thereinto at a velocity of 50 mL/min, continuing to stir and mix for 1 h after a completion of the adding, standing still and aging for 3 h, filtering and separating out a precipitate, and drying the precipitate in a blast oven at 120° C. for 3 h, to obtain a lignin/nano $CaCO_3$ complex; and (4) raising a temperature of the lignin/nano $CaCO_3$ complex to 350° C. at a raising-temperature rate of 10° C./min and maintaining for 60 min, and then raising the temperature to 650° C. at a raising-temperature rate of 15° C./min and maintaining for 1 h, waiting for its decreasing to a room temperature, soaking a carbonized product in a solution of hydrochloric acid of 0.5 mol/L for 3 h, then washing with water, filtering, moving a filter cake into a blast oven at 120° C., and drying for 1 day, to obtain a lignin-based hierarchical porous carbon.

Example 3

The following steps are performed:

(1) dissolving 20 g triethanolamine in water to formulate a solution having a concentration of 200 g/L, dissolving 20 g glutaraldehyde in water to formulate a solution having a concentration of 200 g/L, mixing and reacting the formulated solutions of triethanolamine and glutaraldehyde for 6 h at 80° C., to obtain a solution of triethanolamine-glutaraldehyde condensate;

(2) dissolving 100 g calcium lignosulphonate in water to formulate a solution having a concentration of 300 g/L, then adding 20 g maleic anhydride, 20 g acrylic acid and 10 g hypophosphorous acid thereinto, stirring evenly at 80° C., then adding 200 mL of a sodium persulfate solution having a concentration of 100 g/L thereinto at a velocity of 15 mL/min, reacting for 4 h, then adding the solution of condensate of the step (1) thereinto, and continuing to react for 6 h, to obtain a solution of lignin graft-copolymerized by phosphino carboxylic acid copolymer;

(3) adding 500 mL of an aqueous solution of calcium chloride having a mass concentration of 200 g/L into the above-described solution of lignin graft-copolymerized by phosphino carboxylic acid copolymer at a velocity of 100 mL/min, continuing to stir and mix for 2 h after a completion of the adding, then adding 500 mL of a patassium carbonate solution having a mass concentration of 200 g/L thereinto at a velocity of 100 mL/min, continuing to stir and mix for 3 h after a completion of the adding, standing still and aging for 6 h, filtering and separating out a precipitate, and drying the precipitate in a blast oven at 120° C. for 3 h, to obtain a lignin/nano $CaCO_3$ complex; and (4) raising a temperature of the lignin/nano $CaCO_3$ complex to 350° C. at a raising-temperature rate of 10° C./min and maintaining for 60 min, and then raising the temperature to 950° C. at a raising-temperature rate of 15° C./min and maintaining for 4 h, waiting for its decreasing to a room temperature, soaking a carbonized product in a solution of hydrochloric acid of 2 mol/L for 12 h, then washing with water, filtering, moving a filter cake into a blast oven at 120° C., and drying for 1 day, to obtain a lignin-based hierarchical porous carbon.

Example 4

The following steps are performed:

(1) dissolving 10 g triethanolamine in water to formulate a solution having a concentration of 50 g/L, dissolving 10 g glutaraldehyde in water to formulate a solution having a concentration of 50 g/L, mixing and reacting the formulated solutions of triethanolamine and glutaraldehyde for 3 h at 60° C., to obtain a solution of triethanolamine-glutaraldehyde condensate;

(2) dissolving 100 g magnesium lignosulfonate in water to formulate a solution having a concentration of 100 g/L, then adding 5 g maleic anhydride, 5 g acrylic acid and 2 g hypophosphorous acid thereinto, stirring evenly at 70° C., then adding 125 mL of a sodium persulfate solution having a concentration of 40 g/L thereinto at a velocity of 5 mL/min, reacting for 2 h, then adding the solution of condensate of the step (1) thereinto, and continuing to react for 2 h, to obtain a solution of lignin graft-copolymerized by phosphino carboxylic acid copolymer;

(3) adding 600 mL of an aqueous solution of calcium chloride having a mass concentration of 100 g/L into the above-described solution of lignin graft-copolymerized by phosphino carboxylic acid copolymer at a velocity of 60 mL/min, continuing to stir and mix for 1 h after a completion of the adding, then adding 600 mL of a patassium carbonate solution having a mass concentration of 100 g/L thereinto at a velocity of 60 mL/min, continuing to stir and mix for 2 h after a completion of the adding, standing still and aging for 4 h, filtering and separating out a precipitate, and drying the precipitate in a blast oven at 120° C. for 3 h, to obtain a lignin/nano $CaCO_3$ complex; and (4) raising a temperature of the lignin/nano $CaCO_3$ complex to 350° C. at a raising-temperature rate of 10° C./min and maintaining for 60 min, and then raising the temperature to 750° C. at a raising-temperature rate of 15° C./min and maintaining for 2 h, waiting for its decreasing to a room temperature, soaking a carbonized product in a solution of hydrochloric acid of 1 mol/L for 6 h, then washing with water, filtering, moving a filter cake into a blast oven at 120° C., and drying for 1 day, to obtain a lignin-based hierarchical porous carbon.

Example 5

The following steps are performed:

(1) dissolving 15 g triethanolamine in water to formulate a solution having a concentration of 100 g/L, dissolving 15 g glutaraldehyde in water to formulate a solution having a concentration of 100 g/L, mixing and reacting the formulated solutions of triethanolamine and glutaraldehyde for 4 h at 70° C., to obtain a solution of triethanolamine-glutaraldehyde condensate;

(2) dissolving 100 g sulfonated alkali lignin in water to formulate a solution having a concentration of 150 g/L, then adding 10 g maleic anhydride, 10 g acrylic acid and 5 g hypophosphorous acid thereinto, stirring evenly at 80° C., then adding 200 mL of a sodium persulfate solution having a concentration of 50 g/L thereinto at a velocity of 10 mL/min, reacting for 3 h, then adding the solution of condensate of the step (1) thereinto, and continuing to react for 3 h, to obtain a solution of lignin graft-copolymerized by phosphino carboxylic acid copolymer;

(3) adding 400 mL of an aqueous solution of calcium chloride having a mass concentration of 200 g/L into the above-described solution of lignin graft-copolymerized by phosphino carboxylic acid copolymer at a velocity of 80 mL/min, continuing to stir and mix for 90 min after a completion of the adding, then adding 400 mL of a patassium carbonate solution having a mass concentration of 200 g/L thereinto at a velocity of 80 mL/min, continuing to stir and mix for 3 h after a completion of the adding, standing still and aging for 5 h, filtering and separating out a precipitate, and drying the precipitate in a blast oven at 120° C. for 3 h, to obtain a lignin/nano $CaCO_3$ complex; and (4) raising a temperature of the lignin/nano CaCO$_3$ complex to 350° C. at a raising-temperature rate of 10° C./min and maintaining for 60 min, and then raising the temperature to 850° C. at a raising-temperature rate of 15° C./min and maintaining for 3 h, waiting for its decreasing to a room temperature, soaking a carbonized product in 1.5 mol/L of a solution of hydrochloric acid for 8 h, then washing with water, filtering, moving a filter cake into a blast oven at 120° C., and drying for 1 day, to obtain a lignin-based hierarchical porous carbon.

Example 6

The following steps are performed:

(1) dissolving 20 g triethanolamine in water to formulate a solution having a concentration of 150 g/L, dissolving 20 g glutaraldehyde in water to formulate a solution having a concentration of 150 g/L, mixing and reacting the formulated solutions of triethanolamine and glutaraldehyde for 5 h at 80° C., to obtain a solution of triethanolamine-glutaraldehyde condensate;

(2) dissolving 100 g sulfonated enzymatic lignin in water to formulate a solution having a concentration of 200 g/L, then adding 15 g maleic anhydride, 15 g acrylic acid and 8 g hypophosphorous acid thereinto, stirring evenly at 80° C., then adding 250 mL of a sodium persulfate solution having a concentration of 60 g/L thereinto at a velocity of 15 mL/min, reacting for 4 h, then adding the solution of condensate of the step (1) thereinto, and continuing to react for 4 h, to obtain a solution of lignin graft-copolymerized by phosphino carboxylic acid copolymer;

(3) adding 600 mL of an aqueous solution of calcium chloride having a mass concentration of 150 g/L into the above-described solution of lignin graft-copolymerized by phosphino carboxylic acid copolymer at a velocity of 100 mL/min, continuing to stir and mix for 2 h after a completion of the adding, then adding 600 mL of a patassium carbonate solution having a mass concentration of 150 g/L thereinto at a velocity of 100 mL/min, continuing to stir and mix for 3 h after a completion of the adding, standing still and aging for 6 h, filtering and separating out a precipitate, and drying the precipitate in a blast oven at 120° C. for 3 h, to obtain a lignin/nano CaCO$_3$ complex; and (4) raising a temperature of the lignin/nano CaCO$_3$ complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 2 mol/L for 10 h, then washing with water, filtering, moving a filter cake into a blast oven at 120° C., and drying for 1 day, to obtain a lignin-based hierarchical porous carbon.

Comparative Example 1 (without graft-copolymerizing modification on lignin)

The following steps are performed:

(1) dissolving 20 g triethanolamine in water to formulate a solution having a concentration of 150 g/L, dissolving 20 g glutaraldehyde in water to formulate a solution having a concentration of 150 g/L, mixing and reacting the formulated solutions of triethanolamine and glutaraldehyde at 80° C. for 4 h, to obtain a solution of triethanolamine-glutaraldehyde condensate;

(2) dissolving 100 g sodium lignosulfonate in water to formulate a solution having a concentration of 200 g/L, then adding the solution of condensate of the step (1) thereinto, and continuing to react for 4 h, to obtain a crosslinked lignin solution;

(3) adding 500 mL of an aqueous solution of calcium chloride having a mass concentration of 200 g/L into the above-described crosslinked lignin solution at a velocity of 100 mL/min, continuing to stir and mix for 2 h after a completion of the adding, then adding 500 mL of a patassium carbonate solution having a mass concentration of 200 g/L thereinto at a velocity of 100 mL/min, continuing to stir and mix for 3 h after a completion of the adding, standing still and aging for 6 h, filtering and separating out a precipitate, and drying the precipitate in a blast oven at 120° C. for 3 h, to obtain a lignin/nano CaCO$_3$ complex; and (4) raising a temperature of the lignin/nano CaCO$_3$ complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based porous carbon.

Comparative Example 2 (without cross-linking modification on lignin)

The following steps are performed:

(1) dissolving 100 g sodium lignosulfonate in water to formulate a solution having a concentration of 200 g/L, then adding 20 g maleic anhydride, 20 g acrylic acid and 10 g hypophosphorous acid thereinto, stirring evenly at 80° C., then adding 300 mL of a sodium persulfate solution having a concentration of 50 g/L thereinto at a velocity of 10 mL/min, reacting for 3 h, to obtain a solution of lignin graft-copolymerized by phosphino carboxylic acid copolymer;

(2) adding 500 mL of an aqueous solution of calcium chloride having a mass concentration of 200 g/L into the above-described solution of lignin graft-copolymerized by phosphino carboxylic acid copolymer at a velocity of 100 mL/min, continuing to stir and mix for 2 h after a completion of the dropwise adding, then adding 500 mL of a patassium carbonate solution having a mass concentration of 200 g/L thereinto at a velocity of 100 mL/min, continuing to stir and mix for 3 h after a completion of the dropwise adding, standing still and aging for 6 h, filtering and separating out a precipitate, and drying the precipitate in a blast oven at 120° C. for 3 h, to obtain a lignin/nano CaCO$_3$ complex; and (3) raising a temperature of the lignin/nano CaCO$_3$ complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based porous carbon.

Comparative Example 3 (without any modification on lignin)

The following steps are performed:

(1) dissolving 100 g sodium lignosulfonate in water to formulate a solution having a concentration of 200 g/L, adding 500 mL of an aqueous solution of calcium chloride having a mass concentration of 200 g/L into the above-described lignin solution at a velocity of 100 mL/min, continuing to stir and mix for 2 h after a completion of the adding, then adding 500 mL of a patassium carbonate solution having a mass concentration of 200 g/L thereinto at a velocity of 100 mL/min, continuing to stir and mix for 3 h after a completion of the adding, standing still and aging for 6 h, filtering and separating out a precipitate, and drying the precipitate in a blast oven at 120° C. for 3 h, to obtain a lignin/nano $CaCO_3$ complex; and (2) raising a temperature of the lignin/nano $CaCO_3$ complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based porous carbon.

Comparative Example 4 (directly using $CaCO_3$ nano particle as a templating agent)

The following steps are performed:

(1) dissolving 20 g triethanolamine in water to formulate a solution having a concentration of 150 g/L, dissolving 20 g glutaraldehyde in water to formulate a solution having a concentration of 150 g/L, mixing and reacting the formulated solutions of triethanolamine and glutaraldehyde at 80° C. for 4 h, to obtain a solution of triethanolamine-glutaraldehyde condensate;

(2) dissolving 100 g sodium lignosulfonate in water to formulate a solution having a concentration of 200 g/L, then adding 20 g maleic anhydride, 20 g acrylic acid and 10 g hypophosphorous acid thereinto, stirring evenly at 80° C., then adding 300 mL of a sodium persulfate solution having a concentration of 50 g/L thereinto at a velocity of 10 mL/min, reacting for 3 h, then adding the solution of condensate of the step (1) thereinto, and continuing to react for 4 h, to obtain a solution of lignin graft-copolymerized by phosphino carboxylic acid copolymer;

(3) adding 362 mL of a nano $CaCO_3$ dispersion having a mass concentration of 200 g/L into the above-described solution of lignin graft-copolymerized by phosphino carboxylic acid copolymer upon stirring, continuing to stir and mix for 3 h, standing still and aging for 6 h, filtering and separating out a precipitate, and drying the precipitate in a blast oven at 120° C. for 3 h, to obtain a lignin/$CaCO_3$ complex; and (4) raising a temperature of the lignin/$CaCO_3$ complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based porous carbon.

Comparative Example 5 (directly using $K_2CO_3$ as an activator)

The following steps are performed:

(1) dissolving 20 g triethanolamine in water to formulate a solution having a concentration of 150 g/L, dissolving 20 g glutaraldehyde in water to formulate a solution having a concentration of 150 g/L, mixing and reacting the formulated solutions of triethanolamine and glutaraldehyde at 80° C. for 4 h, to obtain a solution of triethanolamine-glutaraldehyde condensate;

(2) dissolving 100 g sodium lignosulfonate in water to formulate a solution having a concentration of 200 g/L, then adding 20 g maleic anhydride, 20 g acrylic acid and 10 g hypophosphorous acid thereinto, stirring evenly at 80° C., then adding 300 mL of a sodium persulfate solution having a concentration of 50 g/L thereinto at a velocity of 10 mL/min, reacting for 3 h, then adding the solution of condensate of the step (1) thereinto, and continuing to react for 4 h, to obtain a solution of lignin graft-copolymerized by phosphino carboxylic acid copolymer;

(3) adding 362 mL of $K_2CO_3$ aqueous solution having a mass concentration of 200 g/L into the above-described solution of lignin graft-copolymerized by phosphino carboxylic acid copolymer at a velocity of 100 mL/min, continuing to stir and mix for 3 h after a completion of the dropwise adding, standing still and aging for 6 h, filtering and separating out a precipitate, and drying the precipitate in a blast oven at 120° C. for 3 h, to obtain a lignin/$K_2CO_3$ complex; and (4) raising a temperature of the lignin/$K_2CO_3$ complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based porous carbon.

Comparative Example 6 (directly using KCl as an activator)

The following steps are performed:

(1) dissolving 20 g triethanolamine in water to formulate a solution having a concentration of 150 g/L, dissolving 20 g glutaraldehyde in water to formulate a solution having a concentration of 150 g/L, mixing and reacting the formulated solutions of triethanolamine and glutaraldehyde at 80° C. for 4 h, to obtain a solution of triethanolamine-glutaraldehyde condensate;

(2) dissolving 100 g sodium lignosulfonate in water to formulate a solution having a concentration of 200 g/L, then adding 20 g maleic anhydride, 20 g acrylic acid and 10 g hypophosphorous acid thereinto, stirring evenly at 80° C., then adding 300 mL of a sodium persulfate solution having a concentration of 50 g/L thereinto at a velocity of 10 mL/min, reacting for 3 h, then adding the solution of condensate of the step (1) thereinto, and continuing to react for 4 h, to obtain a solution of lignin graft-copolymerized by phosphino carboxylic acid copolymer;

(3) adding 362 mL of KCl aqueous solution having a mass concentration of 200 g/L into the above-described solution of lignin graft-copolymerized by phosphino carboxylic acid copolymer at a velocity of 100 mL/min, continuing to stir and mix for 3 h after a completion of the adding, standing still and aging for 6 h, filtering and separating out a precipitate, and drying the precipitate in a blast oven at 120° C. for 3 h, to obtain a lignin/KCl complex; and (4) raising a temperature of the lignin/KCl complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based porous carbon.

Comparative Example 7 (directly using $CaCl_2$ as an activator)

The following steps are performed:

(1) dissolving 20 g triethanolamine in water to formulate a solution having a concentration of 150 g/L, dissolving 20 g glutaraldehyde in water to formulate a solution having a concentration of 150 g/L, mixing and reacting the formulated solutions of triethanolamine and glutaraldehyde at 80° C. for 4 h, to obtain a solution of triethanolamine-glutaraldehyde condensate;

(2) dissolving 100 g sodium lignosulfonate in water to formulate a solution having a concentration of 200 g/L, then adding 20 g maleic anhydride, 20 g acrylic acid and 10 g hypophosphorous acid thereinto, stirring evenly at 80° C., then adding 300 mL of a sodium persulfate solution having a concentration of 50 g/L thereinto at a velocity of 10 mL/min, reacting for 3 h, then adding the solution of condensate of the step (1) thereinto, and continuing to react for 4 h, to obtain a solution of lignin graft-copolymerized by phosphino carboxylic acid copolymer;

(3) adding 362 mL $CaCl_2$ aqueous solution having a mass concentration of 200 g/L into the above-described solution of lignin graft-copolymerized by phosphino carboxylic acid copolymer at a velocity of 100 mL/min, continuing to stir and mix for 3 h after a completion of the adding, standing still and aging for 6 h, filtering and separating out a precipitate, and drying the precipitate in a blast oven at 120° C. for 3 h, to obtain a lignin/$CaCl_2$ complex; and (4) raising a temperature of the lignin/$CaCl_2$ complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based porous carbon.

Comparative Example 8 (with a method for modifying lignin refering to Example 3 in Chinese patent application CN109851813A)

The following steps are performed:

(1) adding 573 mL water into a round-bottom flask, successively adding 111 g hydrochloric acid, 17 g sulfuric acid, 176 g HEDP, 327 g citric acid, 100 g sodium lignosulfonate, 67 g ammonium chlorie and 60 g zinc sulfate heptahydrate thereinto upon stirring, stirring and mixing, raising a temperature to 80° C., slowly adding 288 g formaldehyde thereinto within 1 hour, and refluxing and reacting at 80° C. for 3 h, to obtain a solution of sodium lignosulfonate containing polycarboxyl and polyphosphino;

(2) adding 500 mL of an aqueous solution of calcium chloride having a mass concentration of 200 g/L into the above-described solution of sodium lignosulfonate containing polycarboxyl and polyphosphino at a velocity of 100 mL/min, continuing to stir and mix for 2 h after a completion of the adding, then adding 500 mL of a patassium carbonate solution having a mass concentration of 200 g/L thereinto at a velocity of 100 mL/min, continuing to stir and mix for 3 h after a completion of the adding, standing still and aging for 6 h, filtering and separating out a precipitate, and drying the precipitate in a blast oven at 120° C. for 3 h, to obtain a lignin/nano $CaCO_3$ complex;

(3) raising a temperature of the lignin/nano $CaCO_3$ complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based hierarchical porous carbon.

Comparative Example 9 (with an activator used for preparing porous carbon referring to a literature of Chemistry of Materials, 2017, 29 (16): 6900-6907.)

The following steps are performed:

(1) dissolving 20 g triethanolamine in water to formulate a solution having a concentration of 150 g/L, dissolving 20 g glutaraldehyde in water to formulate a solution having a concentration of 150 g/L, mixing and reacting the formulated solutions of triethanolamine and glutaraldehyde at 80° C. for 4 h, to obtain a solution of triethanolamine-glutaraldehyde condensate;

(2) dissolving 100 g sodium lignosulfonate in water to formulate a solution having a concentration of 200 g/L, then adding 20 g maleic anhydride, 20 g acrylic acid and 10 g hypophosphorous acid thereinto, stirring evenly at 80° C., then adding 300 mL of a sodium persulfate solution having a concentration of 50 g/L thereinto at a velocity of 10 mL/min, reacting for 3 h, then adding the solution of condensate of the step (1) thereinto, and continuing to react for 4 h, standing still and aging for 6 h, filtering and separating out a precipitate, and drying the precipitate in a blast oven at 120° C. for 3 h, to obtain a lignin graft-copolymerized by phosphino carboxylic acid copolymer;

(3) fully grinding and mixing the above-described lignin graft-copolymerized by phosphino carboxylic acid copolymer with 100 g potassium oxalate, and then adding 100 g nano particles of calcium carbonate thereinto, and grinding and mixing to obtain a lignin/potassium oxalate/calcium carbonate complex; and (4) raising a temperature of the lignin/potassium oxalate/calcium carbonate complex to 350° C. at a raising-temperature rate of 10° C./min and maintaining for 60 min, and then raising the temperature to 850° C. at a raising-temperature rate of 15° C./min and maintaining for 2 h, waiting for its decreasing to a room temperature, soaking a carbonized product in a solution of hydrochloric acid of 1 mol/L for 12 h, then washing with water, filtering, moving a filter cake into a blast oven at 120° C., and drying for 1 day, to obtain a lignin-based hierarchical porous carbon.

The prepared lignin-based porous carbons are applied in an adsorbing material for antibiotic-contaminated wastewater, and the material characterization and adsorption performance tests are carried out. The results are shown in Tables 1 to 2 and FIGS. 1 to 5.

A microscopic morphology and a structure of the sample are characterized by a scanning electron microscopy (SEM, Zeiss Merlin, Germany) and a high-resolution field emission transmission electron microscopy (TEM, JEOL JEM-2100F). A specific surface area and the porous structure of the sample are tested by using an automatic analyzer for specific surface and porosity (Micromeritics ASAP 2020 instrument).

In a test method for a static adsorption performance of the sample, firstly, 10 mg of the samples of the prepared lignin-based hierarchical porous carbon or Comparative Example are added into a conical flask of 100 mL filled with 50 mL of an antibiotic solution having an initial concentration of 200 mg/L. Then, it is put in a thermostatic oscillator having a rotation speed of 160 rpm for adsorbing experiment. The samples are taken out after oscillating and adsorbing for 24 h, and filtered by means of a syringe filter. After that, a residual content of sulfamethazine is measured by means of a high performance liquid chromatograph (Shimadzu LC-20A), and adsorption capacity thereof is calculated. During the static adsorbing experiment, sampling is performed at a certain time interval to test residual content thereof, adsorption capacities for different adsorbing time are obtained through calculating, and a curve for adsorbing time on adsorption capacity is drawn. In the static adsorbing experiment, the adsorption of the adsorbents on the antibiotic having different initial concentrations (50 mg/L, 75 mg/L, 100 mg/L, 150 mg/L, 200 mg/L, 250 mg/L, 300 mg/L, and 350 mg/L) is tested to obtain an equilibrium concentration and an equilibrium adsorption capacity, and an adsorbing isotherm is drawn. The antibiotics for tests are sulfamethazine (sulfonamides) and acetyl isovaleryl tartrate tylosin (macrolides), which have respectively a relative molecular mass of 278.33 and 1192.34, and both are slight soluble in water.

Table 1 is a comparison of the lignin-based hierarchical porous carbons with high specific surface area prepared in the above-described Examples 1 to 6 with the lignin-based porous carbons prepared in Comparative Examples 1 to 9 in terms of the specific surface area and the porous structure.

Table 2 is a comparision of the lignin-based hierarchical porous carbons with high specific surface area prepared in the above-described Examples 1 to 6 with the lignin-based porous carbons prepared in Comparative Examples 1 to 9 in terms of the adsorption performance for antibiotics.

TABLE 1

Specific surface area and porous structure of the lignin-based porous carbon

| lignin-based porous carbon | Chacateristic parameters for pore structure | | | | carbon yield/% |
|---|---|---|---|---|---|
| | $S_{BET}$ $(m^2/g)$ | $V_{total}$ $(cm^3/g)$ | $V_{micro}/V_{total}$ (%) | $V_{mes}/V_{total}$ (%) | |
| Example 1 | 2984 | 1.51 | 53 | 45 | 26 |
| Example 2 | 2616 | 1.31 | 58 | 39 | 24 |
| Example 3 | 2561 | 1.21 | 52 | 45 | 23 |
| Example 4 | 2553 | 1.22 | 57 | 40 | 21 |
| Example 5 | 2616 | 1.33 | 52 | 47 | 25 |
| Example 6 | 2794 | 1.39 | 55 | 42 | 24 |
| Comparative Example 1 | 1839 | 0.98 | 38 | 56 | 23 |
| Comparative Example 2 | 1963 | 0.82 | 35 | 59 | 21 |
| Comparative Example 3 | 1645 | 0.86 | 43 | 45 | 24 |
| Comparative Example 4 | 1045 | 0.61 | 47 | 45 | 24 |
| Comparative Example 5 | 2348 | 1.55 | 64 | 32 | 21 |
| Comparative Example 6 | 1328 | 0.50 | 87 | 6 | 23 |
| Comparative Example 7 | 602 | 1.48 | 8 | 69 | 22 |
| Comparative Example 8 | 2028 | 1.34 | 40 | 52 | 15 |
| Comparative Example 9 | 2605 | 1.44 | 33 | 61 | 10 |

TABLE 2

Adsorption performance for antibiotics of the lignin-based porous carbon

| lignin-based porous carbon | adsorption performance for sulfamethazine | | adsorption performance for acetyl isovaleryl tartrate tylosin | |
|---|---|---|---|---|
| | $Q_e$ (mg/g) | $t_{95\% Q_e}$ (min) | $Q_e$ (mg/g) | $t_{95\% Q_e}$ (min) |
| Example 1 | 827 | 20 | 736 | 18 |
| Example 2 | 761 | 27 | 694 | 23 |
| Example 3 | 772 | 23 | 722 | 20 |
| Example 4 | 753 | 27 | 714 | 23 |
| Example 5 | 786 | 25 | 745 | 17 |
| Example 6 | 746 | 28 | 706 | 22 |
| Comparative Example 1 | 466 | 50 | 443 | 33 |
| Comparative Example 2 | 423 | 47 | 445 | 30 |
| Comparative Example 3 | 351 | 55 | 320 | 35 |
| Comparative Example 4 | 285 | 60 | 275 | 35 |
| Comparative Example 5 | 535 | 80 | 297 | 45 |
| Comparative Example 6 | 140 | 210 | 70 | 50 |
| Comparative Example 7 | 96 | 55 | 280 | 30 |
| Comparative Example 8 | 398 | 55 | 354 | 40 |
| Comparative Example 9 | 477 | 40 | 452 | 25 |

Explanation for Table 1 to Table 2:

The lignin-based hierarchical porous carbon prepared in Example 1 has a specific surface area of 2984 $m^2/g$, which has a equilibrium adsorption capacity of 827 mg/g and 736 mg/g for waste water with simulated contamination of sulfamethazine and acetyl isovaleryl tartrate tylosin having an initial concentration of 200 mg/L, respectively, and may both attain 95% of the equilibrium adsorption capacity within 20 min. The lignin-based hierarchical porous carbon prepared in Example 1 has all excellent adsorption performance and adsorption rate for antibiotics of different molecular weights, and has obvious application previllage in a biomass porous carbon.

The lignin-based hierarchical porous carbons prepared in Examples are compared and analyzed with the lignin-based porous carbons prepared in Comparative Examples, in terms of specific surface area, pore diameter distribution, and adsorption performance etc. The lignin-based hierarchical porous carbons prepared in Examples have all obvious improvement on specific surface area, adsorption capacity, and adsorption rate, reasonably distributed hierarchical porous structure (40% to 48% of mesopore and 50% to 58% of micropore), and excellent adsorption capacity for both micromolecule antibiotic of sulfamethazine and macromolecule antibiotic of acetyl isovaleryl tartrate tylosin, which are obviously distinguished from adsorbents in Comparative Examples and other adsorbents having only adsorption performance for micromolecule antibiotics or macromolecule antibiotics. In addition, all Examples have higher yields of 20% to 30%. The reason for the lignin-based hierarchical porous carbon prepared in the present invention having the above-described excellent performances is analyzed. The lignin modified by graft-copolymerizing with phosphino carboxylic acid copolymer has three-dimensional network structure and abundant $Ca^{2+}$ combination sites, is beneficial for uniform dispersing and stabilization of $Ca^{2+}$, avoids rapid nucleation and growth of $CaCO_3$ in the three-dimensional network of the lignin, and obtains nano $CaCO_3$ particles uniformly and stably distributed in the three-dimensional network structure of the lignin. During carbonizing at a high temperature, mesopores and a portion of macropores can be manufactured with nano $CaCO_3$ as a hard template, and carbon dioxide released by the pyrolysis of nano $CaCO_3$ can perform gas-phase exfoliation or etching on the lignin-based porous carbon to generate micropores. The porous structure of the lignin-based porous carbon is fully developed with nano $CaCO_3$ as the templating agent and the activator simultaneously, to form the lignin-based hierarchical porous carbon with high specific surface area having interlinked pores and channels, and the interlinked structure of micropore/mesopore/macropore hierarchical pores and high specific surface area thereof promote rapid mass transfer and efficient adsorption of antibiotic molecules in the lignin porous structure. Moreover, it has universal applicability for antibiotics of different molecular weights.

However, Comparative Examples 1 to 3 respectively mix the lignins without suffering from graft-copolymerizing modification or/and cross-linking modification with the calcium salt and the precipitant. Due to lack of the complexing effect of phosphino and carboxylic acid functional groups or the spatial confinement effect of stable three-dimensional network structure of the lignin, the obtained $CaCO_3$ particles easily agglomerate and move during carbonizing, and higher specific surface area and abundant micropore/mesopore structure can't therefore be obtained, thus leading to limited adsorbing ability for antibiotics. Comparative Example 4 directly uses $CaCO_3$ particles for impregnating and mixing with the lignin during the preparation, which is too big to be better embedded in the three-dimensional network structure of the lignin, and uniform complexation of $CaCO_3$ with the lignin could not thus be realized. During carbonizing, the porous structure of the lignin-based porous carbon could not be fully developed, and therefore the adsorbing ability for antibiotics thereof is limited. Comparative Example 5 directly uses $K_2CO_3$ having bigger specific surface area as an activator, but the activating effect of $K_2CO_3$ on the lignin mainly generates a micropore structure and a portion of mesopore structure. During adsorbing, a portion of micropores can't enable the pollutants to enter due to too small pores, leading to a decrease of availability of the pores. Therefore, it has different adsorption capacities for sulfamethazine and acetyl isovaleryl tartrate tylosin, adsorption for acetyl isovaleryl tartrate tylosin as a macromolecule antibiotic, could not fully utilize pores and channels of the micropores, thus decreasing adsorption capacity. Comparative Example 6 has an adsorption capacity for sulfamethazine 1.5 times of that in Comparative Example 7; and Comparative Example 7 has an adsorption capacity for acetyl isovaleryl tartrate tylosin 4 times that in Comparative Example 6, which correlates with a pore diameter distribution of pores for them two. Comparative Example 6 directly uses KCl as an activator, in which the pore structure is almost all micropores; and Comparative Example 7 directly uses $CaCl_2$ as an activator, in which the pore structure is almost all mesopores. With regard to micromolecule antibiotics, what contributes to adsorption capacity is mainly micropore structure, because too big diameter of the mesopore results in limited interception effect for micromolecule antibiotics. With regard to macromolecule antibiotics, what contributes to adsorption capacity is mainly mesopore structure, because smaller diameter of the micropore can't enable the macromolecule antibiotics to enter.

With reference to the prior art, Comparative Example 8 and Comparative Example 9 respectively perform polycarboxyl and polyphosphino modification on the lignin or use potassium oxalate and calcium carbonate as a binary activator. The porous carbon prepared in Comparative Example 8 has a production obviously less than that in Examples, due to an obvious decrease of carbon content in the modified lignin. In addition, due to denser distribution of the functional groups in the modified lignin, it has stronger adsorbing effect for $Ca^{2+}$, lignin and $CaCO_3$ could not form uniform and reasonable distribution, and $CaCO_3$ is mainly distributed on the outer surface of the lignin structure, leading to inhomogeneous activating effect during carbonizing The porous structure of the obtained porous carbon is also inhomogeneous and insufficient, and therefore has an adsorbing effect for antibiotics obviously less than that in Examples. Comparative Example 9 prepares a porous carbon by using potassium oxalate as an activator and nano calcium carbonate as a templating agent through grinding, mixing and carbonizing, whose carbon yield is only 10%. This is because the binary activator excessively activates the lignin-based carbon, and the complexation of lignin with calcium carbonate is by menas of physical complexation of grinding and mixing, so that fully uniform complexation could not be realized between the lignin and calcium carbonate. Therefore, the obtained porous carbons have a more disordered structure, and have both adsorption capacitis for antibiotics much less than those of Examples.

All Examples and Comparative Example have adsorption rates for acetyl isovaleryl tartrate tylosin all greater than the adsorption rates for sulfamethazine. This is because what macromolecule antibiotics mainly utilize are mesopores with better accessibility, and what micromolecule antibiotics mainly utilize are micropores with poorer accessibility.

FIG. 1 is a SEM photograph of a lignin-based hierarchical porous carbon prepared in Example 1 of the present invention, it can be seen from the figure that a lignin-based hierarchical porous carbon prepared in the present invention has a loose and open three-dimensional structure with abundant porous structure.

Figure 2:
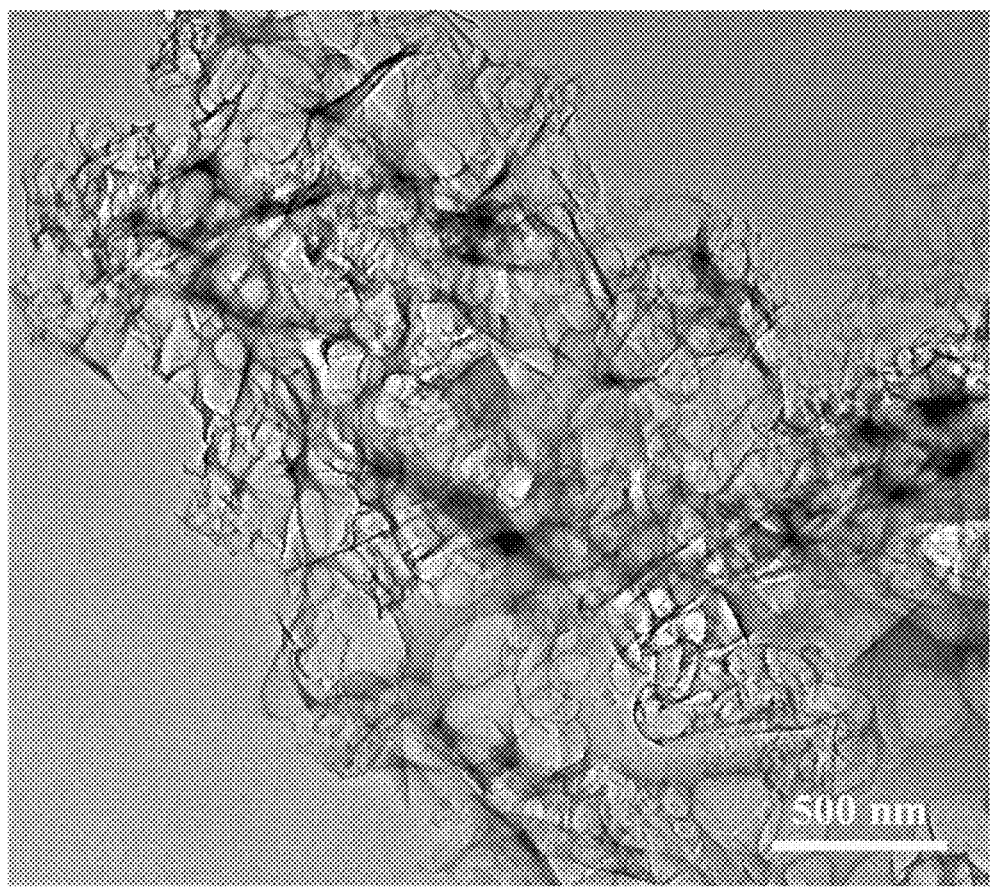
FIG. 2 is a TEM photograph of a lignin-based hierarchical porous carbon prepared in Example 1 of the present invention.

FIG. 2 is a TEM photograph of a lignin-based hierarchical porous carbon prepared in Example 1 of the present invention, it can be seen from the figure that an interior porous structure of a lignin-based hierarchical porous carbon prepared in the present invention, is abundant and has better connectivity.

Figure 3:
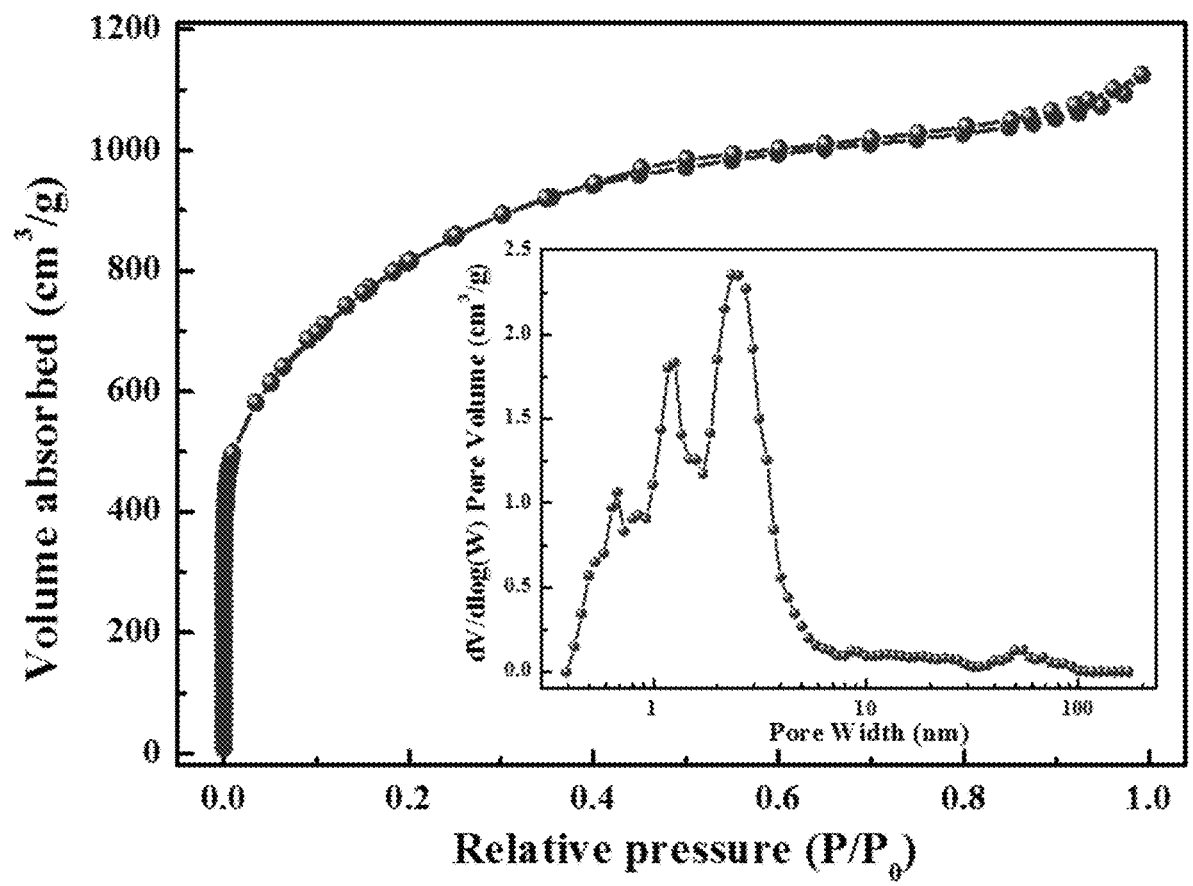
FIG. 3 is an adsorption-desorption curve for nitrogen gas and a pore diameter distribution graph of a lignin-based hierarchical porous carbon prepared in Example 1 of the present invention.

FIG. 3 is an adsorption-desorption curve for nitrogen gas and a pore diameter distribution graph of a lignin-based hierarchical porous carbon prepared in Example 1 of the present invention, it can be seen from the figure that the adsorption-desorption curve for the lignin-based hierarchical porous carbon prepared in the present invention belongs to isotherms of type I and type IV and has a hysteresis loop of type H4. In an area of lower relative pressure, adsorption capacity for nitrogen gas rapidly increases, demonstrating that it has micropore structure. However, in an area of higher relative pressure, hysteresis loop appears, and when relative pressure close to 1, the adsorption capacity for nitrogen gas has obvious increase, demonstrating that it has mesopore structure. The lignin-based hierarchical porous carbon has a total BET specific surface area of 2984 $m^2/g$, and a total volume of pore of 1.51 $cm^3/g$, wherein a micropore volume is 0.80 $cm^3/g$, and a mesopore volume is 0.68 $cm^3/g$. The lignin-based hierarchical porous carbon has a pore diameter intensively distributed in a range of 0.5 to 2 nm for micropores and a range of 2 to 6 nm for mesopores, and has a portion of mesopores and macropores in a range of 40 to 70 nm. Therefore, the lignin-based hierarchical porous carbon has a hierarchical porous structure of micropore/mesopore/macropore. High specific surface area, abundant porous structure and reasonable pore diameter distribution of the lignin-based hierarchical porous carbon are beneficial for realizing rapid mass transfer and high adsorption capacity during adsorbing.

Figure 4:
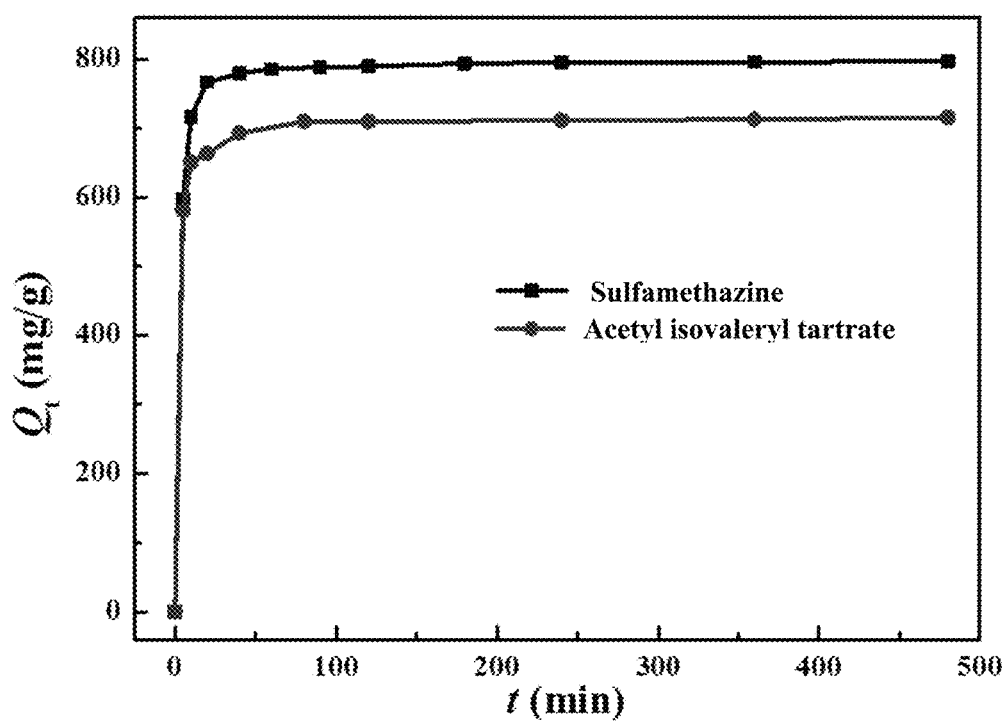
FIG. 4 is a relationship curve of adsorption capacity with adsorbing time for an antibiotic-contaminated solution of a lignin-based hierarchical porous carbon prepared in Example 1 of the present invention.

FIG. 4 is a relationship curve of adsorption capacity with adsorbing time for an antibiotic-contaminated solution of a lignin-based hierarchical porous carbon prepared in Example 1 of the present invention, it can be seen from the figure that the lignin-based hierarchical porous carbon prepared in the present invention has excellent adsorption performance for sulfamethazine and acetyl isovaleryl tartrate, and 95% of the equilibrium adsorption capacity may all be attained within 20 min, demonstrating that the lignin-based hierarchical porous carbon has faster adsorption rate.

Figure 5:
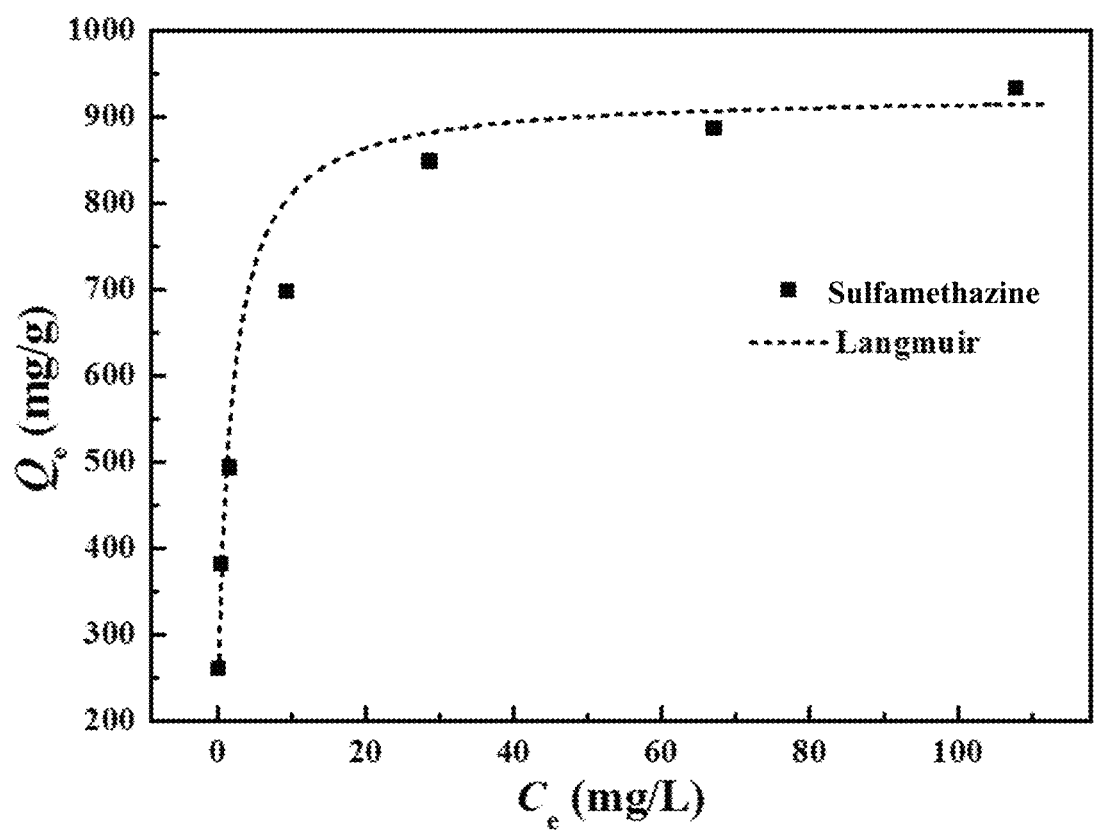
FIG. 5 is an adsorbing isotherm for an antibiotic-contaminated solution of a lignin-based hierarchical porous carbon prepared in Example 1 of the present invention.

FIG. 5 is an adsorbing isotherm for an antibiotic-contaminated solution of a lignin-based hierarchical porous carbon prepared in Example 1 of the present invention, it can be seen from the figure that a lignin-based hierarchical porous carbon prepared in the present invention has an adsorbing isotherm for antibiotic sulfamethazine fitting Langmuir model, with a theoretical maximum single-layer adsorption capacity of 905 mg/g, slightly less than the maximum adsorption capacity for the experimental value 933 mg/g, and the lignin-based hierarchical porous carbon has very high adsorption capacity for antibiotic sulfamethazine.

The above-described Examples are preferred embodiments of the present invention, but embodiments of the present invention are not limited to the above-described Examples, any other changes, modifications, substitutions, combinations, and simplifications made without departing from the spirit and the principle of the present invention should all be equivalent replacement modes, and all be contained in the protection scope of the present invention.

The invention claimed is:

1. A preparation method for a lignin-based hierarchical porous carbon with a specific surface area of 2200-3000 $m^2/g$, comprising the following steps:
   (1) stirring and mixing aqueous solutions of triethanolamine and glutaraldehyde at 50 to 80° C., and reacting for 1 to 6 h, to obtain a solution of triethanolamine-glutaraldehyde condensate;
   (2) formulating a lignin into an aqueous solution having a mass concentration of 50 to 300 g/L, then adding maleic anhydride, acrylic acid and hypophosphorous acid thereinto, stirring evenly at 60 to 80° C., then dropwise adding an initiator solution having a predetermined mass concentration, reacting for 2 to 4 h, then adding the solution of condensate of the step (1) thereinto, and continuing to react for 1 to 6 h, to obtain a solution of lignin graft-copolymerized by phosphino carboxylic acid copolymer;
   (3) adding an aqueous solution of a soluble calcium salt into the solution of lignin graft-copolymerized by phosphino carboxylic acid copolymer obtained in the step (2) at a predetermined volumetric flowrate, continuing to stir and mix for 30 min to 2 h after a completion of the adding, then adding an aqueous solution of a soluble carbonate thereinto at a predetermined volumetric flowrate, continuing to stir and mix for 1 to 3 h after completion of the adding, standing still and aging for 3 to 6 h, filtering and separating out a precipitate, and drying the precipitate, to obtain a lignin/nano $CaCO_3$ complex; and
   (4) carbonizing the lignin/nano $CaCO_3$ complex obtained in the step (3) in an inert atmosphere, then washing with an acid, washing with water, filtering, and drying, to obtain a lignin-based hierarchical porous carbon;

in terms of parts by weight, a formula for quantities of respective reactants is as follows:

| | |
|---|---|
| lignin | 100 parts, |
| triethanolamine | 5 to 20 parts, |
| glutaraldehyde | 5 to 20 parts, |
| maleic anhydride | 2 to 20 parts, |
| acrylic acid | 2 to 20 parts, |
| hypophosphorous acid | 1 to 10 parts, |
| initiator | 2 to 20 parts, |
| soluble calcium salt | 50 to 100 parts, and |
| soluble carbonate | 50 to 100 parts, | the lignin in the step (2) is at least one selected from the group consisting of sodium lignosulfonate in a red liquor from acid pulping, calcium lignosulphonate in the red liquor from acid pulping, magnesium lignosulfonate in the red liquor from acid pulping, a sulfonated product of alkali lignin in a black liquor from alkaline pulping or a sulfonated product of enzymatic lignin from a biorefinery process.

2. The preparation method for the lignin-based hierarchical porous carbon according to claim 1, wherein, in the step (3), the soluble calcium salt is at least one of calcium chloride, calcium nitrate and calcium acetate; and the soluble carbonate is at least one of potassium carbonate, sodium carbonate and ammonium carbonate.

3. The preparation method for the lignin-based hierarchical porous carbon according to claim 1, wherein, mass concentrations of the soluble calcium salt solution and the soluble carbonate solution in the step (3) are 50 to 200 g/L, and the volumetric flowrates for the adding are both 50 to 100 mL/min.

4. The preparation method for the lignin-based hierarchical porous carbon according to claim 1, wherein, a temperature for the carbonizing in the step (4) is 650 to 950° C., and a time for the carbonizing is 1 to 4 h.

5. The preparation method for the lignin-based hierarchical porous carbon according to claim 4, wherein, the temperature for the carbonizing in the step (4) is 750 to 850° C., and the time for the carbonizing is 2 to 3 h.

6. The preparation method for the lignin-based hierarchical porous carbon according to claim 1, wherein, in the mixed solution of triethanolamine and glutaraldehyde of the step (1), the mass concentrations of triethanolamine and glutaraldehyde are both 20 to 200 g/L; and the initiator in the step (2) is sodium persulfate; a volumetric flowrate for dropwise adding the initiator solution is 2 to 15 mL/min, and a mass concentration of the initiator solution is 20 to 100 g/L.

7. The preparation method for the lignin-based hierarchical porous carbon according to claim 1, wherein, the washing with the acid in the step (4) comprises placing the carbonized product in a solution of the acid of 0.5 to 2 mol/L and soaking for 3 to 12 h; and the solution of the acid is at least one of a solution of hydrochloric acid, a solution of sulfuric acid, and a solution of nitric acid.

8. A lignin-based hierarchical porous carbon prepared according to the method of claim 1.

9. An application of the lignin-based hierarchical porous carbon according to claim 8, comprising using the lignin-based hierarchical porous carbon in an adsorbing material for treating antibiotic-contaminated wastewater.

10. A preparation method for a lignin-based hierarchical porous carbon according to claim 1, wherein the inert atmosphere is nitrogen gas.

* * * * *